US007386388B2

(12) United States Patent
Akazaki et al.

(10) Patent No.: US 7,386,388 B2
(45) Date of Patent: Jun. 10, 2008

(54) AIR-FUEL RATIO CONTROL SYSTEM AND METHOD FOR INTERNAL COMBUSTION ENGINE, AND ENGINE CONTROL UNIT

(75) Inventors: Shusuke Akazaki, Saitama-ken (JP); Takahide Mizuno, Saitama-ken (JP); Masayoshi Nishino, Saitama-ken (JP); Mitsuo Hashizume, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/798,031

(22) Filed: May 9, 2007

(65) Prior Publication Data

US 2007/0265763 A1 Nov. 15, 2007

(30) Foreign Application Priority Data

May 10, 2006 (JP) ............................ 2006-131958

(51) Int. Cl.
*G06F 19/00* (2006.01)
*F02M 7/00* (2006.01)
*F02D 41/14* (2006.01)

(52) U.S. Cl. ...................... 701/103; 701/109; 701/111; 123/435; 123/674

(58) Field of Classification Search ................ 701/103, 701/105, 108, 109, 102, 111, 114; 123/435, 123/674, 480
See application file for complete search history.

(56) References Cited

U.S. PATENT DOCUMENTS 4,926,825 A * 5/1990 Ohtaka et al. .............. 123/694
5,445,136 A * 8/1995 Yamashita et al. .......... 123/689
5,755,212 A 5/1998 Ajima
5,781,700 A * 7/1998 Puskorius et al. ............ 706/14
6,014,963 A * 1/2000 Narita ........................ 123/674

FOREIGN PATENT DOCUMENTS

DE 103 19 529 B3 7/2004
DE 10 2004 045 154 A1 3/2006
WO WO 2004/048761 A1 6/2004

OTHER PUBLICATIONS

European Search Report for Application No. 07009451.1 dated Jul. 24, 2007.

* cited by examiner

*Primary Examiner*—Hieu T Vo
(74) *Attorney, Agent, or Firm*—Squire, Sanders & Dempsey L.L.P.

(57) ABSTRACT

An air-fuel ratio control system for an internal combustion engine, which is capable of accurately estimating an exhaust gas state parameter according to the properties of fuel, thereby making it possible to properly control the air-fuel ratio of a mixture. The air-fuel ratio control system 1 estimates an exhaust gas state parameter indicative of a state of exhaust gases, as an estimated exhaust gas state parameter ($AF_{13}$ NN) by inputting a detected combustion state parameter (DCADLYIG) indicative of a combustion state of the mixture in the engine 3, and detected operating state parameters (NE, TW, PBA, IGLOG, TOUT) indicative of operating states of the engine 3, to a neural network (NN) configured as a network to which are input the combustion state parameter (DCADLYIG) and the operating state parameters (NE, TW, PBA, IGLOG, TOUT), and in which the exhaust gas state parameter is used as a teacher signal (step 1), and controls the air-fuel ratio based on the estimated exhaust gas state parameter (AF_NN) (steps 3, 4, and 24 to 28).

27 Claims, 8 Drawing Sheets

AIR-FUEL RATIO CONTROL SYSTEM AND METHOD FOR INTERNAL COMBUSTION ENGINE, AND ENGINE CONTROL UNIT

BACKGROUND OF THE INVENTION

1. Field of the Invention

This invention relates to an air-fuel ratio control system and method for an internal combustion engine and an engine control unit, for controlling an air-fuel ratio of a mixture supplied to the engine.

2. Description of the Related Art

Conventionally, there has been disclosed an air-fuel ratio control system e.g. in Japanese Laid-Open Patent Publication (Kokai) No. 2004-360628. In this air-fuel ratio control system, when an O2 sensor is active, the amount of fuel to be supplied to the engine is controlled based on an exhaust air-fuel ratio detected by the O2 sensor, whereby air-fuel ratio feedback control is carried out. On the other hand, when the O2 sensor is not active during the start of the engine, the air-fuel ratio feedback control is not carried out, but the amount of supply fuel is controlled without being based on the exhaust air-fuel ratio to control the air-fuel ratio by open control.

As described above, according to the conventional air-fuel ratio control system, the amount of supply fuel is controlled without being based on the exhaust air-fuel ratio during the start of the engine, so that e.g. when fuel difficult to burn is used, the output power from the engine is lowered, which causes degradation of a combustion state and drivability. To avoid such inconveniences, it is considered that a target value of the air-fuel ratio is set to the rich side. In this case, however, the output power from the engine becomes too large when fuel is easy to burn, whereby exhaust emissions are increased and drivability is degraded. Further, when the exhaust emissions are increased, a catalyst containing a large amount of a noble metal has to be used for reducing the exhaust emissions, which results in the increased manufacturing costs of the catalyst.

SUMMARY OF THE INVENTION

It is an object of the invention to provide an air-fuel ratio control system and method for an internal combustion engine and an engine control unit which are capable of accurately estimating an exhaust gas state parameter according to the properties of fuel, thereby making it possible to properly control the air-fuel ratio of a mixture.

To attain the above object, in a first aspect of the present invention, there is provided an air-fuel ratio control system for an internal combustion engine, for controlling an air-fuel ratio of a mixture supplied to the engine, comprising combustion state parameter-detecting means for detecting a combustion state parameter indicative of a combustion state of the mixture in the engine, operating state parameter-detecting means for detecting an operating state parameter indicative of an operating state of the engine, exhaust gas state parameter-estimating means for estimating an exhaust gas state parameter indicative of a state of exhaust gases emitted from the engine, as an estimated exhaust gas state parameter, by inputting the detected combustion state parameter and the detected operating state parameter to a neural network configured as a neural network to which are input the combustion state parameter and the operating state parameter, and in which the exhaust gas state parameter is used as a teacher signal, and air-fuel ratio control means for controlling the air-fuel ratio based on the estimated exhaust gas state parameter.

With the configuration of this air-fuel ratio control system, the exhaust gas state parameter indicative of a state of exhaust gases is estimated as the estimated exhaust gas state parameter by inputting the detected combustion state parameter and the detected operating state parameter, to the neural network configured as a network to which are input the combustion state parameter and the operating state parameter, and in which the exhaust gas state parameter is used as a teacher signal. Further, the air-fuel ratio of the mixture supplied to the engine is controlled based on the estimated exhaust gas state parameter.

The combustion state of the mixture in the engine and the operating state of the engine have close correlations with the exhaust gas state, and hence the exhaust gas state parameter indicative of the state of exhaust gases is estimated based on the combustion state parameter and the operating state parameter representing the combustion state and the operating state, respectively, whereby it is possible to perform the estimation with accuracy. Further, there is a close correlation between the properties of fuel and the combustion state, and fuel having different properties gives a different combustion state. Therefore, by estimating the exhaust gas state parameter based on the neural network configured as the network to which is input the combustion state parameter, it is possible to accurately estimate the exhaust gas state parameter according to the properties of fuel. Further, since the air-fuel ratio is controlled based on the estimated exhaust gas state parameter accurately estimated as described above, it is possible to control the air-fuel ratio properly such that exhaust emissions are reduced as desired. As a result, exhaust emissions can be more reduced.

The neural network has a characteristic that compared with the case of a linear model being used, it is possible to easily model a multi-input event and a nonlinear event in which the relationship between inputs and outputs is nonlinear. According to the present invention, since the relationship between the combustion state parameter and the operating state parameter, and the exhaust gas state parameter is modeled using the above-described neural network, the relationship between the parameters, which becomes nonlinear particularly during the start of the engine, can be easily modeled. Furthermore, since the combustion state parameter and the operating state parameter, which have high correlations with the exhaust gas state parameter, are used as inputs to the model, it is possible to simplify the model. Therefore, it is possible to reduce the number of units for constructing the neural network, whereby it is possible to reduce the computation load on the air-fuel ratio control system.

Preferably, the combustion state parameter-detecting means detects the combustion state parameter based on an output from an in-cylinder pressure sensor for detecting pressure within a cylinder of the engine.

With the configuration of this preferred embodiment, the combustion state parameter is detected based on the pressure within the cylinder, which has a close correlation with the combustion state. This makes it possible to detect the combustion state parameter with higher accuracy. Further, when the in-cylinder pressure sensor has already been provided, there is no need to provide a new component for estimating the exhaust gas state parameter, which makes it possible to reduce the manufacturing costs of the air-fuel ratio control system.

Preferably, the parameters used in the neural network are set to predetermined values.

With the configuration of this preferred embodiment, the parameters used in the neural network are set to the predetermined values, so that compared with a case in which the parameters are learned e.g. by a back propagation method, as required, it is possible to further reduce the computation load on the air-fuel ratio control system.

Preferably, the air-fuel ratio control system further comprises an exhaust gas state parameter sensor for detecting the exhaust gas state parameter as a detected exhaust gas state parameter, and sensor active state-determining means for determining whether the exhaust gas state parameter sensor is active, wherein the air-fuel ratio control means performs first feedback control for feedback-controlling the air-fuel ratio such that the estimated exhaust gas state parameter becomes equal to a predetermined target value, when the exhaust gas state parameter sensor is not active, and second feedback control for feedback-controlling the air-fuel ratio such that the detected exhaust gas state parameter becomes equal to the predetermined target value, when the exhaust gas state parameter sensor is active.

With the configuration of this preferred embodiment, when the exhaust gas state parameter sensor is not active, and hence it is impossible to obtain a detected exhaust gas state parameter with sufficient accuracy, the air-fuel ratio is feedback-controlled such that in place of the detected exhaust gas state parameter, the estimated exhaust gas state parameter accurately estimated becomes equal to the predetermined target value. This makes it possible to positively more reduce exhaust emissions. Further, when the exhaust gas state parameter sensor is active, the air-fuel ratio is feedback-controlled such that the detected exhaust gas state parameter which is high in accuracy becomes equal to the predetermined target value, whereby it is also possible to positively reduce exhaust emissions.

More preferably, the air-fuel ratio control means performs the first feedback control and the second feedback control, using first and second predetermined feedback gains which are different from each other, respectively.

With the configuration of this preferred embodiment, the first predetermined feedback gain is used for the first feedback control which is performed based on the estimated exhaust gas state parameter when the exhaust gas state parameter sensor is not active, while the second predetermined feedback gain different from the first feedback gain is used for the second feedback control which is performed based on the detected exhaust gas state parameter when the exhaust gas state parameter sensor is active. The estimated exhaust gas state parameter is lower in accuracy than the detected exhaust gas state parameter which is detected when the exhaust gas state parameter sensor is active. Therefore, e.g. by setting the first feedback gain to a lower value, the control of the air-fuel ratio can be stably performed. Further, when the exhaust gas state parameter sensor is active, an accurate detected exhaust gas state parameter can be obtained, so that e.g. by setting the second feedback gain to a higher value, it possible to converge the exhaust gas state parameter to the target value quickly and stably.

Preferably, the air-fuel ratio control system further comprises an exhaust gas state parameter sensor for detecting the exhaust gas state parameter as a detected exhaust gas state parameter, sensor active state-determining means for determining whether the exhaust gas state parameter sensor is active, and correction means for correcting deviation of the estimated exhaust gas state parameter from the detected exhaust gas state parameter, according to the detected exhaust gas state parameter obtained when the exhaust gas state parameter sensor is active and the estimated exhaust gas state parameter.

With the configuration of this preferred embodiment, deviation of the estimated exhaust gas state parameter from the detected exhaust gas state parameter is corrected by the correction means according to the detected exhaust gas state parameter obtained when the exhaust gas state parameter sensor is active and the estimated exhaust gas state parameter. Therefore, even when the estimated exhaust gas state parameter deviates and drifts from an actual exhaust gas state parameter due to aging of the characteristics of the engine, the drift can be properly corrected based on the detected exhaust gas state parameter which is detected by the exhaust gas state parameter sensor in the active state and hence is more accurate. Particularly when the parameters used in the neural network described above are set to the predetermined values, even when the relationship between the inputs and the output, that is, the relationship between the combustion state parameter and the operating state parameter, and the exhaust gas state parameter is changed e.g. by the aging of the characteristics of the engine, the configuration of the neural network is not changed by the change, but the estimated exhaust gas state parameter is easy to drift, whereby it is possible to obtain the above-described effects.

More preferably, the correction means comprises correction value-calculating means for calculating a correction value based on the detected exhaust gas state parameter obtained when the exhaust gas state parameter sensor is active and the estimated exhaust gas state parameter, and correction value-storing means for storing the calculated correction value, and corrects the estimated exhaust gas state parameter obtained when the exhaust gas state parameter sensor is not active, based on the stored correction value.

With the configuration of this preferred embodiment, the correction value for correcting the deviation of the estimated exhaust gas state parameter from the detected exhaust gas state parameter is calculated based on the detected exhaust gas state parameter obtained when the exhaust gas state parameter sensor is active and the estimated exhaust gas state parameter. As described above, since the correction value is calculated based on the detected exhaust gas state parameter which is detected by the exhaust gas state parameter sensor in the active state and hence is accurate, it is possible to calculate a correction value most appropriate for correcting the drift of the estimated exhaust gas state parameter. Further, the calculated correction value is stored, and the estimated exhaust gas state parameter obtained when the exhaust gas state parameter sensor is not active is corrected based on the stored correction value. This makes it possible to obtain a corrected and accurate estimated exhaust gas state parameter when the exhaust gas state parameter sensor is not active and hence it is impossible to obtain a detected exhaust gas state parameter with sufficient accuracy.

More preferably, the correction means comprises corrected estimated exhaust gas state parameter-calculating means for calculating a corrected estimated exhaust gas state parameter, based on a model defining a relationship between the corrected estimated exhaust gas state parameter which is obtained by correcting the estimated exhaust gas state parameter and the estimated exhaust gas state parameter, and identification means for identifying a model parameter of the model, based on the detected exhaust gas state parameter obtained when the exhaust gas state parameter sensor is active and the estimated exhaust gas state parameter, such that the corrected estimated exhaust gas state parameter becomes equal to the detected exhaust gas state parameter, the air-fuel ratio control means controlling the air-fuel ratio, using the corrected estimated exhaust gas state parameter as the estimated exhaust gas state parameter.

With the configuration of this preferred embodiment, the corrected estimated exhaust gas state parameter is calculated based on the model defining the relationship between the corrected estimated exhaust gas state parameter obtained by correcting the exhaust gas state parameter and the estimated exhaust gas state parameter. The model parameter of the model is identified based on the detected exhaust gas state parameter obtained when the exhaust gas state parameter sensor is active and the estimated exhaust gas state parameter, such that the corrected estimated exhaust gas state parameter becomes equal to the detected exhaust gas state parameter. As a result, even when the estimated exhaust gas state parameter drifts e.g. due to the aging of the characteristics of the engine, the corrected estimated exhaust gas state parameter can be calculated such that it becomes equal to the accurate detected exhaust gas state parameter detected by the exhaust gas state parameter sensor in the active state, thereby making it possible to properly correct the drift of the estimated exhaust gas state parameter.

Further, since the corrected estimated exhaust gas state parameter is calculated based on the model, a memory capacity required of the air-fuel ratio control system can be reduced compared with the case where correction values calculated based on the detected exhaust gas state parameter and the estimated exhaust gas state parameter are stored in a manner associated with the operating states of the engine, and the estimated exhaust gas state parameter is corrected using a correction value corresponding to the present operating state by selecting from the large number of stored correction values.

Further preferably, the correction means further comprises model parameter-storing means for storing the model parameter, and the corrected estimated exhaust gas state parameter-calculating means calculates the corrected estimated exhaust gas state parameter based on the model using the stored model parameter, when the exhaust gas state parameter sensor is not active.

With the configuration of this preferred embodiment, the model parameter is stored, and the corrected estimated exhaust gas state parameter is calculated based on the model using the stored model parameter, when the exhaust gas state parameter sensor is not active. This makes it possible to obtain a corrected and accurate estimated exhaust gas state parameter when the exhaust gas state parameter sensor is not active, and hence it is impossible to obtain a detected exhaust gas state parameter with sufficient accuracy.

To attain the above object, in a second aspect of the present invention, there is provided a method of controlling an air-fuel ratio of a mixture supplied to an internal combustion engine, comprising a combustion state parameter-detecting step of detecting a combustion state parameter indicative of a combustion state of the mixture in the engine, an operating state parameter-detecting step of detecting an operating state parameter indicative of an operating state of the engine, an exhaust gas state parameter-estimating step of estimating an exhaust gas state parameter indicative of a state of exhaust gases emitted from the engine, as an estimated exhaust gas state parameter, by inputting the detected combustion state parameter and the detected operating state parameter to a neural network configured as a neural network to which are input the combustion state parameter and the operating state parameter, and in which the exhaust gas state parameter is used as a teacher signal, and an air-fuel ratio control step of controlling the air-fuel ratio based on the estimated exhaust gas state parameter.

With the configuration of the second aspect of the present invention, it is possible to obtain the same advantageous effects as provided by the first aspect of the present invention.

Preferably, the combustion state parameter-detecting step includes detecting the combustion state parameter based on an output from an in-cylinder pressure sensor for detecting pressure within a cylinder of the engine.

Preferably, the parameters used in the neural network are set to predetermined values.

Preferably, the method further comprises a sensor active state-determining step of determining whether an exhaust gas state parameter sensor for detecting the exhaust gas state parameter as a detected exhaust gas state parameter is active, and the air-fuel ratio control step includes performing first feedback control for feedback-controlling the air-fuel ratio such that the estimated exhaust gas state parameter becomes equal to a predetermined target value, when the exhaust gas state parameter sensor is not active, and second feedback control for feedback-controlling the air-fuel ratio such that the detected exhaust gas state parameter becomes equal to the predetermined target value, when the exhaust gas state parameter sensor is active.

More preferably, the air-fuel ratio control step includes performing the first feedback control and the second feedback control, using first and second predetermined feedback gains which are different from each other, respectively.

Preferably, the method further comprises a sensor active state-determining step of determining whether an exhaust gas state parameter sensor for detecting the exhaust gas state parameter as a detected exhaust gas state parameter is active, and a correction step of correcting deviation of the estimated exhaust gas state parameter from the detected exhaust gas state parameter, according to the detected exhaust gas state parameter obtained when the exhaust gas state parameter sensor is active and the estimated exhaust gas state parameter.

More preferably, the correction step comprises a correction value-calculating step of calculating a correction value based on the detected exhaust gas state parameter obtained when the exhaust gas state parameter sensor is active and the estimated exhaust gas state parameter, a correction value-storing step of storing the calculated correction value, and a step of correcting the estimated exhaust gas state parameter obtained when the exhaust gas state parameter sensor is not active, based on the stored correction value.

More preferably, the correction step comprises a corrected estimated exhaust gas state parameter-calculating step of calculating a corrected estimated exhaust gas state parameter, based on a model defining a relationship between the corrected estimated exhaust gas state parameter which is obtained by correcting the estimated exhaust gas state parameter and the estimated exhaust gas state parameter, and an identification step of identifying a model parameter of the model, based on the detected exhaust gas state parameter obtained when the exhaust gas state parameter sensor is active and the estimated exhaust gas state parameter, such that the corrected estimated exhaust gas state parameter becomes equal to the detected exhaust gas state parameter, wherein the air-fuel ratio control step includes controlling the air-fuel ratio, using the corrected estimated exhaust gas state parameter as the estimated exhaust gas state parameter.

Further preferably, the correction step further comprises a model parameter-storing step of storing the model parameter, and the corrected estimated exhaust gas state parameter-calculating step includes calculating the corrected estimated exhaust gas state parameter based on the model using the stored model parameter, when the exhaust gas state parameter sensor is not active.

With the configurations of these preferred embodiments, it is possible to obtain the same advantageous effects as provided by the corresponding preferred embodiments of the first aspect of the present invention.

To attain the above object, in a third aspect of the present invention, there is provided an engine control unit including a control program for causing a computer to control an air-fuel ratio of a mixture supplied to an internal combustion engine, wherein the control program causes the computer to detect a combustion state parameter indicative of a combustion state of the mixture in the engine, detect an operating state parameter indicative of an operating state of the engine, estimate an exhaust gas state parameter indicative of a state of exhaust gases emitted from the engine, as an estimated exhaust gas state parameter, by inputting the detected combustion state parameter and the detected operating state parameter to a neural network configured as a neural network to which are input the combustion state parameter and the operating state parameter, and in which the exhaust gas state parameter is used as a teacher signal, and control the air-fuel ratio based on the estimated exhaust gas state parameter.

With the configuration of the third aspect of the present invention, it is possible to obtain the same advantageous effects as provided by the first aspect of the present invention.

Preferably, the control program causes the computer to detect the combustion state parameter based on an output from an in-cylinder pressure sensor for detecting pressure within a cylinder of the engine.

Preferably, the parameters used in the neural network are set to predetermined values.

Preferably, the control program further causes the computer to determine whether an exhaust gas state parameter sensor for detecting the exhaust gas state parameter as a detected exhaust gas state parameter is active, and causes the computer to perform first feedback control for feedback-controlling the air-fuel ratio such that the estimated exhaust gas state parameter becomes equal to a predetermined target value, when the exhaust gas state parameter sensor is not active, and second feedback control for feedback-controlling the air-fuel ratio such that the detected exhaust gas state parameter becomes equal to the predetermined target value, when the exhaust gas state parameter sensor is active.

More preferably, the control program causes the computer to perform the first feedback control and the second feedback control, using first and second predetermined feedback gains which are different from each other, respectively.

Preferably, the control program further causes the computer to determine whether an exhaust gas state parameter sensor for detecting the exhaust gas state parameter as a detected exhaust gas state parameter is active, and correct deviation of the estimated exhaust gas state parameter from the detected exhaust gas state parameter, according to the detected exhaust gas state parameter obtained when the exhaust gas state parameter sensor is active and the estimated exhaust gas state parameter.

More preferably, the control program causes the computer to calculate a correction value based on the detected exhaust gas state parameter obtained when the exhaust gas state parameter sensor is active and the estimated exhaust gas state parameter, store the calculated correction value, and correct the estimated exhaust gas state parameter obtained when the exhaust gas state parameter sensor is not active, based on the stored correction value.

More preferably, the control program causes the computer to calculate a corrected estimated exhaust gas state parameter, based on a model defining a relationship between the corrected estimated exhaust gas state parameter which is obtained by correcting the estimated exhaust gas state parameter and the estimated exhaust gas state parameter, identify a model parameter of the model, based on the detected exhaust gas state parameter obtained when the exhaust gas state parameter sensor is active and the estimated exhaust gas state parameter, such that the corrected estimated exhaust gas state parameter becomes equal to the detected exhaust gas state parameter, and control the air-fuel ratio, using the corrected estimated exhaust gas state parameter as the estimated exhaust gas state parameter.

Further preferably, the control program causes the computer to store the model parameter, and calculate the corrected estimated exhaust gas state parameter based on the model using the stored model parameter, when the exhaust gas state parameter sensor is not active.

With the configurations of these preferred embodiments, it is possible to obtain the same advantageous effects as provided by the corresponding preferred embodiments of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENT

Figure 1:
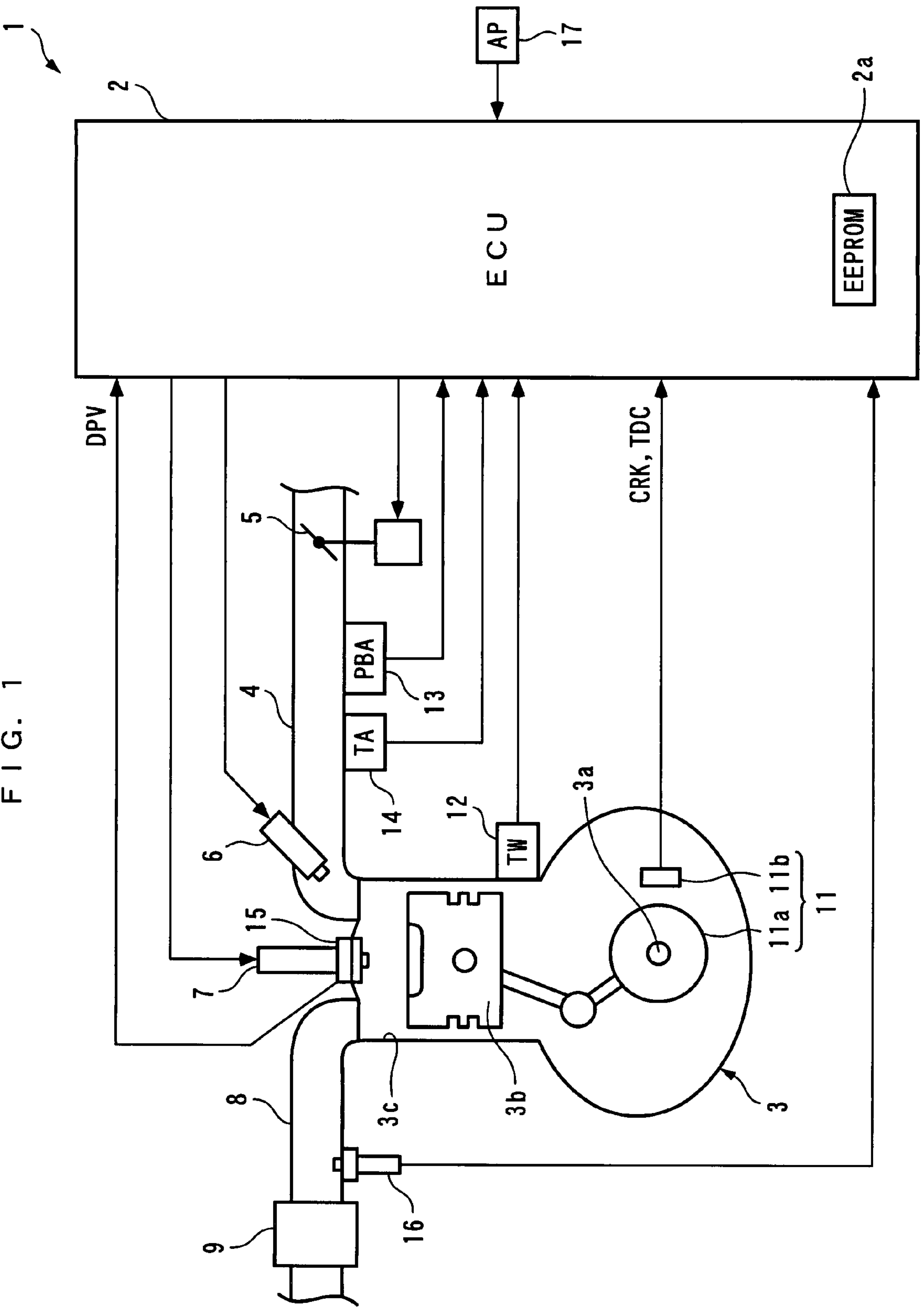
FIG. 1 is a schematic diagram showing an air-fuel ratio control system according to the present embodiment, and an internal combustion engine to which the air-fuel ratio control system is applied.

The present invention will now be described in detail with reference to the drawings showing a preferred embodiment thereof. FIG. 1 schematically shows an air-fuel ratio control system 1 according to the present embodiment, and an internal combustion engine (hereinafter simply referred to as "the engine") 3 to which the air-fuel ratio control system 1 is applied. The engine 3 is e.g. a four-stroke cycle gasoline engine installed on a vehicle.

The engine 3 is provided with a crank angle sensor 11 (operating state parameter-detecting means), and an engine coolant temperature sensor 12 (operating state parameter-detecting means). The crank angle sensor 11 is comprised of a magnet rotor 11*a* fitted on a crankshaft 3*a*, and an MRE pickup 11*b*, and delivers a CRK signal and a TDC signal, which are pulse signals, to an ECU 2 of the air-fuel ratio control system 1 in accordance with rotation of the crankshaft 3*a*.

Each pulse of the CRK signal is generated whenever the crankshaft 3*a* rotates through a predetermined crank angle (e.g. 1°), and the ECU 2 calculates rotational speed NE of the engine 3 (hereinafter referred to as "the engine speed NE") based on the CRK signal. Further, the TDC signal indicates that each piston 3*b* in the engine 3 is in a predetermined crank angle position slightly before the TDC position at the start of the intake stroke, and each pulse of the TDC signal is generated whenever the crankshaft 3*a* rotates through a predetermined crank angle. The ECU 2 calculates a crank angle CA with respect to the TDC signal, based on the TDC signal and the CRK signal. In the present embodiment, the engine speed NE corresponds to an operating state parameter.

The engine coolant temperature sensor 12 is implemented e.g. by a thermistor, and detects an engine coolant temperature TW to deliver a signal indicative of the sensed engine coolant temperature TW to the ECU 2. The engine coolant temperature TW represents the temperature of an engine coolant circulating through a cylinder block, not shown, of the engine 3. In the present embodiment, the engine coolant temperature TW corresponds to the operating state parameter.

An intake pipe 4 of the engine 3 has a throttle valve 5, an intake pipe pressure sensor 13 (operating state parameter-detecting means), and an intake air temperature sensor 14 arranged therein in the mentioned order from the upstream side. The degree of opening of the throttle valve 5 is controlled by the ECU 2, whereby the amount of intake air is controlled. The intake pipe pressure sensor 13 detects pressure PBA within the intake pipe 4 (hereinafter referred to as "the intake pipe pressure PBA") as an absolute pressure, to deliver a detection signal indicative of the sensed intake pipe pressure PBA to the ECU 2, while the intake air temperature sensor 14 detects temperature within the intake pipe 4 (hereinafter referred to as "the intake air temperature") to deliver a detection signal indicative of the sensed intake air temperature to the ECU 2. In the present embodiment, the intake pipe pressure PBA corresponds to the operating state parameter.

An injector 6 (air-fuel ratio control means) is inserted into the intake pipe 4 at a location downstream of the throttle valve 5 in a manner facing an intake port, not shown. A fuel injection amount TOUT of fuel to be injected by the injector 6 is controlled by the ECU 2. In the present embodiment, the fuel injection amount TOUT corresponds to the operating state parameter.

Each cylinder 3*c* of the engine 3 has a spark plug 7 inserted therein. The spark plug 7 has a high voltage applied thereto in timing corresponding to ignition timing IGLOG by a drive signal from the ECU 2, and subsequent interruption of the application of the high voltage causes a spark discharge to ignite an air-fuel mixture within the cylinder 3*c*. It should be noted that the ignition timing IGLOG is represented by the crank angle CA. Further, in the present embodiment, the ignition timing IGLOG corresponds to the operating state parameter.

The spark plug 7 has an in-cylinder pressure sensor 15 (combustion state parameter-detecting means) integrally mounted thereon. The in-cylinder pressure sensor 15, which is formed by a piezoelectric element, delivers to the ECU 2 a detection signal indicative of a sensed amount of change in the pressure within the cylinder 3*c*. The ECU 2 calculates the pressure within the cylinder 3*c* (hereinafter referred to as "the in-cylinder pressure") based on an output DPV from the in-cylinder pressure sensor 15, as described hereinafter.

An exhaust pipe 8 of the engine 3 has a catalytic device 9 disposed therein. The catalytic device 9 is a combination of a three-way catalyst and a NOx adsorbing catalyst, and eliminates NOx, CO and HC contained in exhaust gases exhausted from the engine 3.

A LAF sensor 16 (exhaust gas state parameter sensor) is inserted into the exhaust pipe 8 at a location upstream of the catalytic device 9. The LAF sensor 16 linearly detects the concentration of oxygen in exhaust gases, and delivers a detection signal proportional to the oxygen concentration to the ECU 2. The ECU 2 calculates a detected air-fuel ratio $AF_{13}$ ACT indicative of an air-fuel ratio of the air-fuel mixture corresponding to the oxygen concentration in exhaust gases (hereinafter referred to as "the exhaust air-fuel ratio"), based on the oxygen concentration sensed by the LAF sensor 16. It should be noted that the detected air-fuel ratio AF_ACT is calculated as an equivalent ratio. Further, in the present embodiment, the detected air-fuel ratio AF_ACT corresponds to a detected exhaust gas state parameter.

Furthermore, a detection signal indicative of a sensed stepped-on amount AP of an accelerator pedal of the vehicle (hereinafter referred to as "the accelerator opening AP") is delivered to the ECU 2 from an accelerator opening sensor 17.

The ECU 2 is implemented by a microcomputer comprised of an I/O interface, a CPU, a RAM, a ROM, and an EEPROM 2*a* (correction value-storing means, model parameter-storing means). The ECU 2 determines operating states of the engine 3, based on the detection signals delivered from the above-mentioned sensors 11 to 17, then estimates the above-described exhaust air-fuel ratio, based on the determined operating states, and executes an engine control process including a fuel injection amount control process. In the present embodiment, the ECU 2 corresponds to the combustion state parameter-detecting means, the operating state parameter-detecting means, exhaust gas state parameter-estimating means, sensor active state-determining means, the air-fuel ratio control means, correction means, correction value-calculating means, correction value-storing means, corrected estimated exhaust gas state parameter-calculating means, and identification means.

Figure 2:
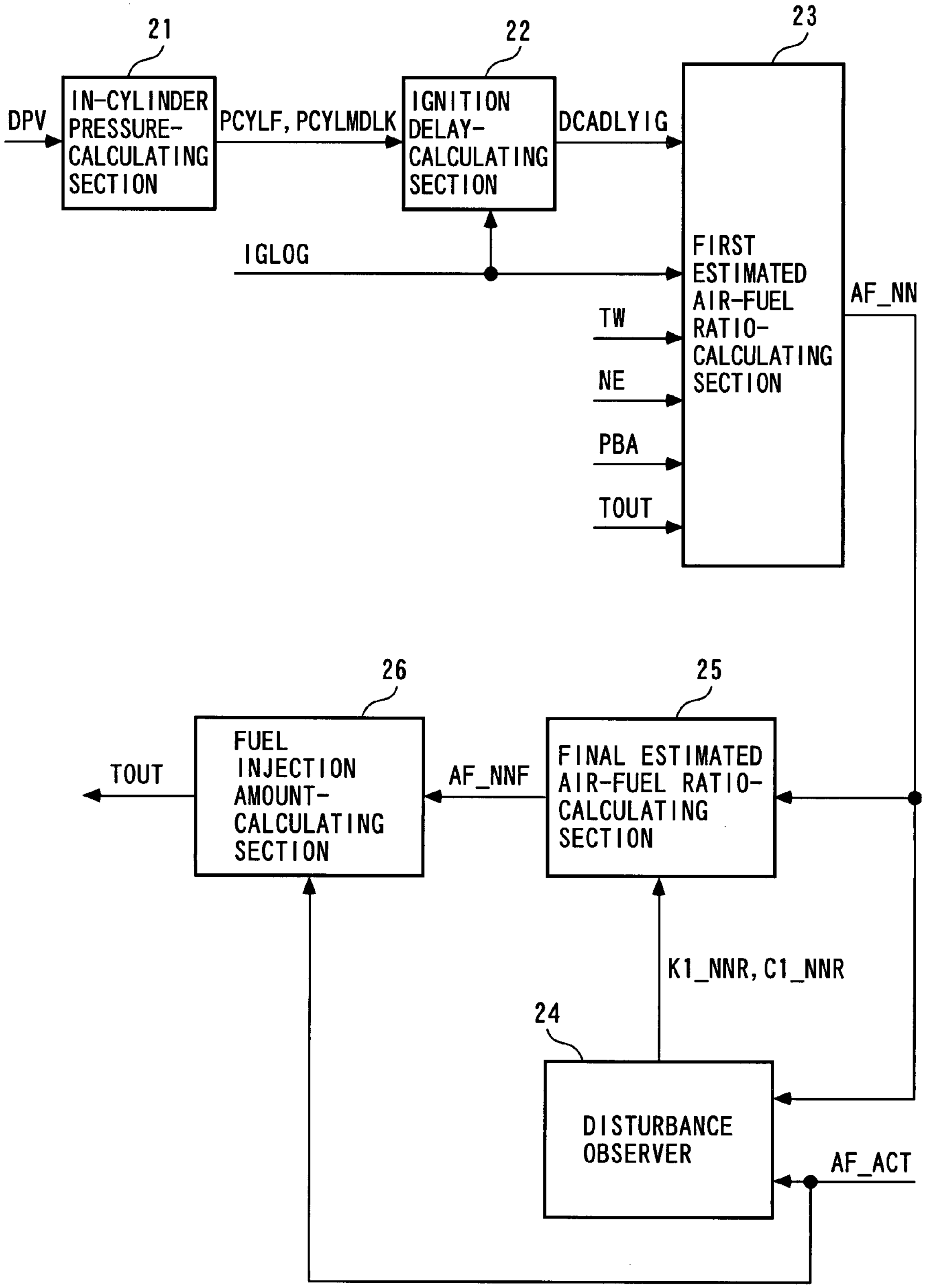
FIG. 2 is a block diagram of the air-fuel ratio control system according to the present embodiment.

As shown in FIG. 2, the air-fuel ratio control system 1 is comprised of an in-cylinder pressure-calculating section 21, an ignition delay-calculating section 22, a first estimated air-fuel ratio-calculating section 23, a disturbance observer 24, a final estimated air-fuel ratio-calculating section 25, and a fuel injection amount-calculating section 26, all of which are implemented by the ECU 2.

The in-cylinder pressure-calculating section 21 (combustion state parameter-detecting means) calculates a final in-cylinder pressure PCYLF and a motoring pressure PCYLMDLK to output the same to the ignition delay-calculating section 22. The motoring pressure PCYLMDLK (n) is an in-cylinder pressure which is generated in the cylinder when combustion is not performed. The motoring pressure PCYLMDLK(n) is calculated by the gas state equation, based on an intake air amount QA(n), an intake air temperature TA(n), and a volume Vc(n) of the cylinder 3*c*. The intake air amount QA(n) is calculated based on the engine speed NE(n) and the intake pipe pressure PBA(n). The volume Vc(n) of the cylinder 3*c* is defined as the volume of a space defined by a cylinder head, not shown, the cylinder 3*c*, and the piston 3*b*, and is calculated based on the volume of the combustion chamber, the cross-sectional area of the piston 3*b*, the crank angle CA, the length of a connecting rod, and the crank length of the crankshaft 3*a*. It should be noted that the symbol n represents a discretized time, and discrete data with the symbol (n) indicates that it is data calculated or sampled in timing synchronous with generation of each pulse of the CRK signal. This also applies to discrete data (time-series data) referred to hereinafter. Further, in the following, the symbol (n) is omitted as deemed appropriate.

The final in-cylinder pressure PCYLF is calculated as follows: First, the output DPV from the in-cylinder pressure sensor 15 is integrated by a charger amplifier, and then a provisional value PCYLT is calculated e.g. by eliminating temperature-dependent noise from the integral value. Next, the final in-cylinder pressure PCYLF is calculated by correcting the calculated provisional value PCYLT as follows.

This correction is performed so as to correct deviation of the provisional value PCYLT from an actual in-cylinder pressure, which is caused by the aging of the in-cylinder pressure sensor 15. The provisional value PCYLT is corrected from the following viewpoint: During a period from the start of the compression stroke to a time point immediately before the ignition timing IGLOG (hereinafter referred to as "the non-combustion compression period"), combustion is not performed, and therefore the motoring pressure PCYLMDLK is held equal to the actual in-cylinder pressure. Further, during the non-combustion compression period, since compression of the volume Vc of the cylinder 3*c* by the piston 3*b* causes the in-cylinder pressure to change more sharply than in the intake stroke and the exhaust stroke, during which combustion is not performed, either, the deviation of the provisional value PCYLT from the actual in-cylinder pressure becomes clear. For these reasons, the correction of the provisional value PCYLT is performed using a PCYLT value and a PCYLMDLK value obtained during the non-combustion compression period.

The relationship between the provisional value PCYLT(n) and an identified value PCYLT_HAT(n) can be defined by the following equation (1). The identified value PCYLT_HAT(n) represents a PCYLT value obtained by correcting the deviation caused by the aging of the in-cylinder pressure sensor 15. First, during the non-combustion compression period, a vector θ(n) of model parameters K1(n) and C1(n) of the equation (1) is identified by an sequential least-squares method expressed by the following equations (2) to (8):

$$\mathrm{PCYLT\_HAT}(n) = K1(n) \cdot PCYLT(n) + C1(n) \tag{1}$$

$$\theta(n) = \theta(n-1) + KP(n) \cdot ide(n) \tag{2}$$

$$\theta(n)^T = [K1(n)\ \ C1(n)] \tag{3}$$

$$ide(n) = \mathrm{PCYLT\_HAT}(n) - PCYLMDLK(n) \tag{4}$$

-continued $$\mathrm{PCYLT\_HAT}(n) = \theta(n-1)^T \cdot \zeta(n) \tag{5}$$

$$\zeta(n)^T = [PCYLT(n)\ \ 1] \tag{6}$$

$$KP(n) = \frac{P(n) \cdot \zeta(n)}{1 + \zeta(n)^T \cdot P(n) \cdot \zeta(n)} \tag{7}$$

$$P(n+1) = \frac{1}{\lambda_1} \cdot \left( I - \frac{\lambda_2 \cdot P(n) \cdot \zeta(n) \cdot \zeta(n)^T}{\lambda_1 + \lambda_2 \cdot \zeta(n)^T \cdot P(n) \cdot \zeta(n)} \right) \cdot P(n) \tag{8}$$

$I$: UNIT MATRIX $\lambda_1, \lambda_2$: WEIGHT PARAMETER

In the equation (2), KP(n) represents a vector of a gain coefficient, and ide(n) represents an identification error. $\theta(n)^T$ in the equation (3) represents a transposed matrix of the vector θ(n). The identification error ide(n) in the equation (2) is calculated by the equation (4), and ζ(n) in the equation (5) represents a vector the transposed matrix of which is represented by the equation (6). Further, the vector KP(n) of the gain coefficient is calculated by the equation (7). P(n) in the equation (7) represents a square matrix of order 2 defined by the equation (8). Weight parameters $\lambda_1$ and $\lambda_2$ in the equation (8) are set to 1.

The vector θ(n) is calculated with an algorithm expressed by the equations (2) to (8) such that the identification error ide(n) is minimized. More specifically, the vector θ(n) is identified such that the identified value PCYLT_HAT(n) becomes equal to the motoring pressure PCYLMDLK(n). It should be noted that at the start of the engine 3, the immediately preceding value θ(n-1) of the vector θ(n), which is used e.g. in the equation (2), is set to a predetermined value.

Then, the obtained parameters K1(n) and C1(n) are learned, and the final in-cylinder pressure PCYLF is calculated by the following equation (9), based on the learned parameters K1(n) and C1(n):

$$PCYLF(n) = K1(n) \cdot PCYLT(n) + C1(n) \tag{9}$$

It should be noted that during a period from the end of the current non-combustion compression period to the start of the next identification of the vector θ(n), the model parameters K1(n) and C1(n) finally obtained during the current non-combustion compression period is used for calculation of the final in-cylinder pressure PCYLF.

As described hereinbefore, during the non-combustion compression period, the motoring pressure PCYLMDLK is equal to the actual in-cylinder pressure, and the model parameters K1(n) and C1(n) shown in the equation (1) are obtained such that the identified value PCYLT_HAT becomes equal to the PCYLMDLK value. In other words, the K1 value and the C1 value are calculated such that the PCYLT_HAT value becomes equal to the actual in-cylinder pressure. Therefore, the final in-cylinder pressure PCYLF can be accurately calculated as a value indicative of the in-cylinder pressure by the equation (9) in which the final in-cylinder pressure PCYLF is substituted for the PCYLT_HAT value in the equation (1).

Figure 3A:
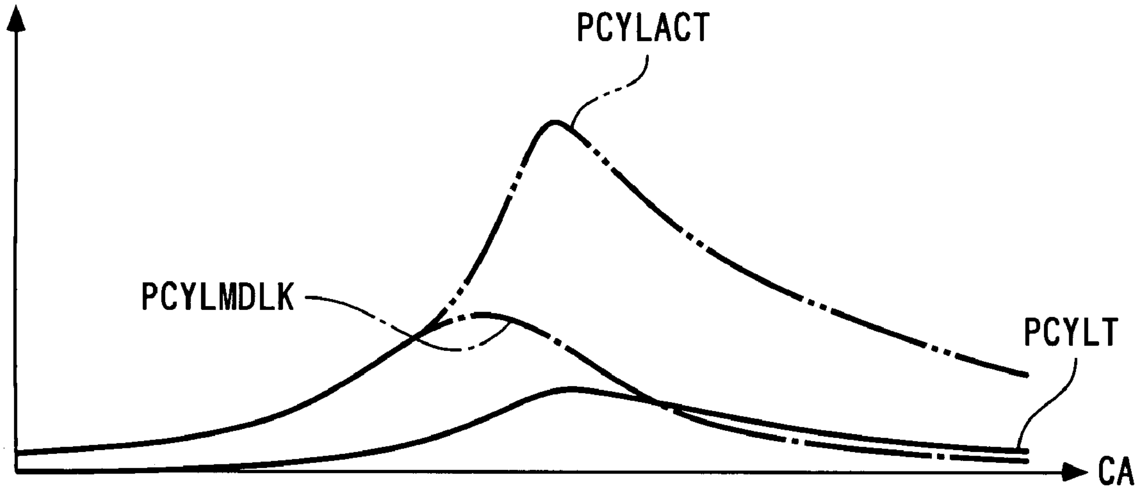
FIG. 3A is a diagram showing an example of changes in a provisional value and associated pressure values when an in-cylinder pressure sensor has undergone aging.
Figure 3B:
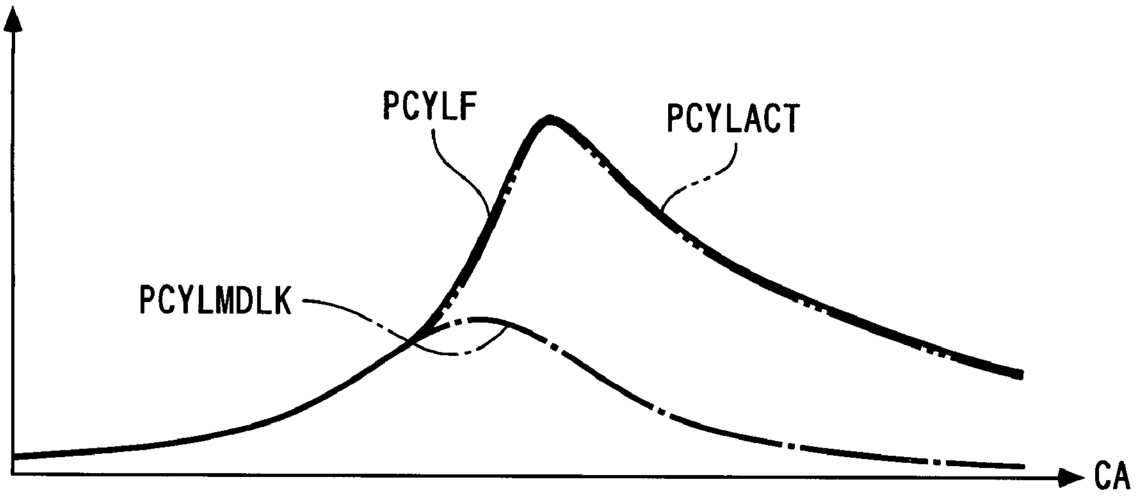
FIG. 3B is a diagram showing an example of changes in a final in-cylinder pressure and associated pressure values when the in-cylinder pressure sensor has undergone aging.

FIG. 3A shows an example of changes in the provisional value PCYLT and associated pressure values, and FIG. 3B shows an example of changes in the final in-cylinder pressure PCYLF and associated pressure values, in the case where the in-cylinder pressure sensor 15 has undergone aging. The output DPV from the in-cylinder pressure sensor 15 is lowered by the aging, and the provisional value PCYLT is not corrected by the model parameters K1 and C1, and therefore as shown in FIG. 3A, the PCYLT value has become much smaller than the actual in-cylinder pressure PCYLACT.

In contrast, the final in-cylinder pressure PCYLF is substantially equal to the actual in-cylinder pressure PCYLACT with little error, and therefore its accuracy is very high.

The ignition delay-calculating section 22 (combustion state parameter-detecting means) calculates an ignition delay DCADLYIG based on the final in-cylinder pressure PCYLF and the motoring pressure PCYLMDLK, and outputs the ignition delay DCADLYIG to the first estimated air-fuel ratio-calculating section 23. In the present embodiment, the ignition delay DCADLYIG corresponds to the combustion state parameter.

Figure 4:
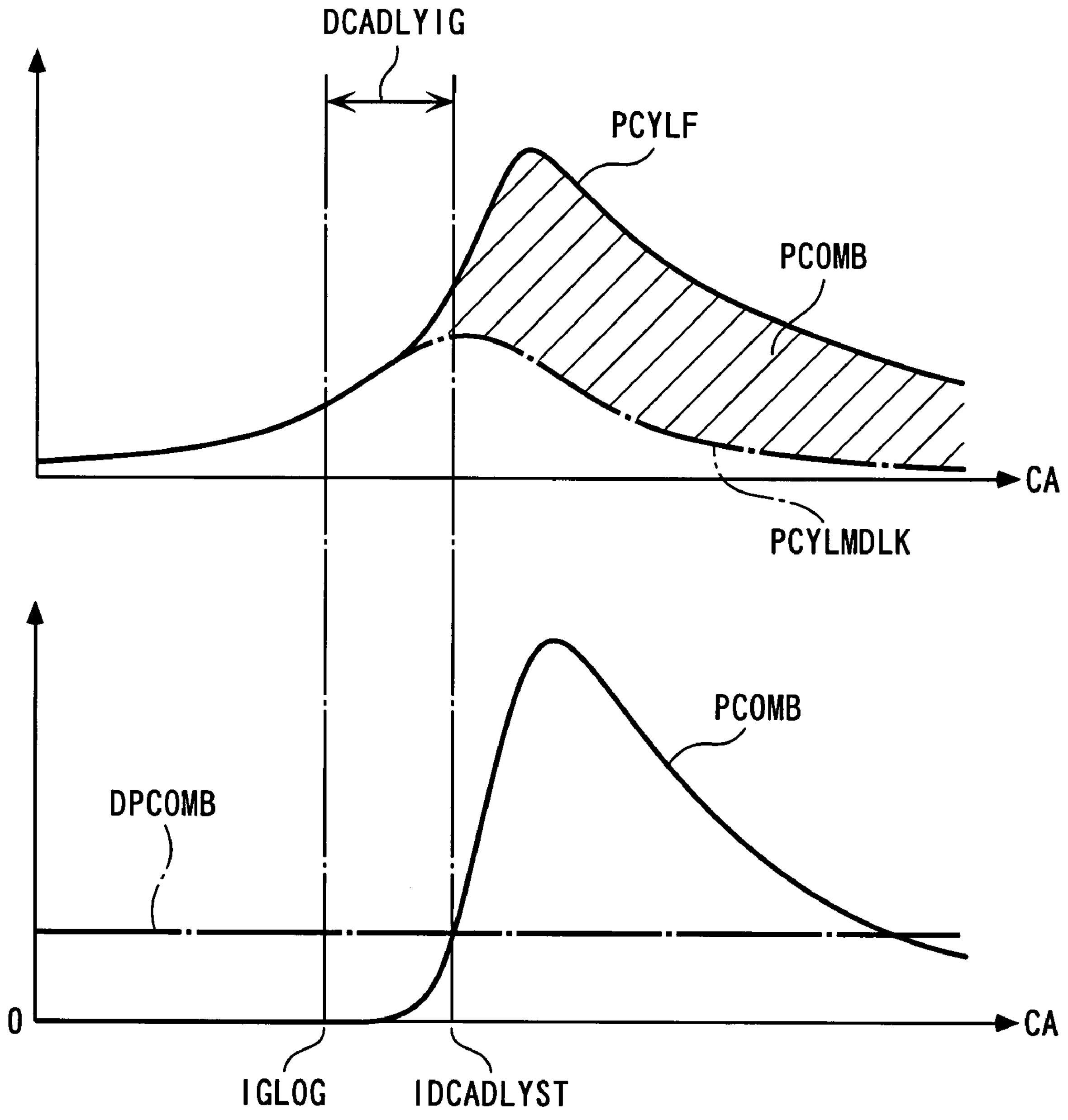
FIG. 4 is a diagram which is useful in explaining a method of calculating ignition delay.

The calculation of the ignition delay DCADLYIG is performed e.g. as shown in FIG. 4. More specifically, the difference between the final in-cylinder pressure PCYLF(n) and the motoring pressure, PCYLMDLK(n) is calculated as an in-cylinder pressure difference PCOMB(n), and the calculated in-cylinder pressure difference PCOMB(n) is stored in a manner associated with each current crank angle CA changing during a time period from the ignition timing IGLOG to end of the expansion stroke. Then, the motoring pressure PCYLMDLK(n) obtained in the TDC timing at the end of the compression stroke is multiplied by a value of 0.1 to thereby calculate an ignition determination threshold value DPCOMB.

Then, a plurality of the stored in-cylinder pressure differences PCOMB and the ignition determination threshold value DPCOMB are compared with each other, and a crank angle CA corresponding to the in-cylinder pressure difference PCOMB immediately after the PCOMB value has exceeded the ignition determination threshold value DPCOMB is set as timing IDCADLYST in which the air-fuel mixture is actually ignited (hereinafter referred to as "the actual ignition timing IDCADLYST"). Then, the ignition delay DCADLYIG is calculated by subtracting the ignition timing IGLOG from the set actual ignition timing IDCADLYST.

The first estimated air-fuel ratio-calculating section 23 (exhaust gas state parameter-estimating means) calculates a first estimated air fuel ratio AF_NN representative of the exhaust air-fuel ratio, in synchronism with generation of each TDC signal pulse, based on the ignition delay DCADLYIG, the engine coolant temperature TW, the engine speed NE, the intake pipe pressure PBA, the ignition timing IGLOG, and the fuel injection amount TOUT, which are input thereto, and outputs the calculated first estimated air fuel ratio AF_NN to the disturbance observer 24 and the final estimated air-fuel ratio-calculating section 25. In the present embodiment, the first estimated air fuel ratio AF_NN corresponds to an estimated exhaust gas state parameter.

Figure 5:
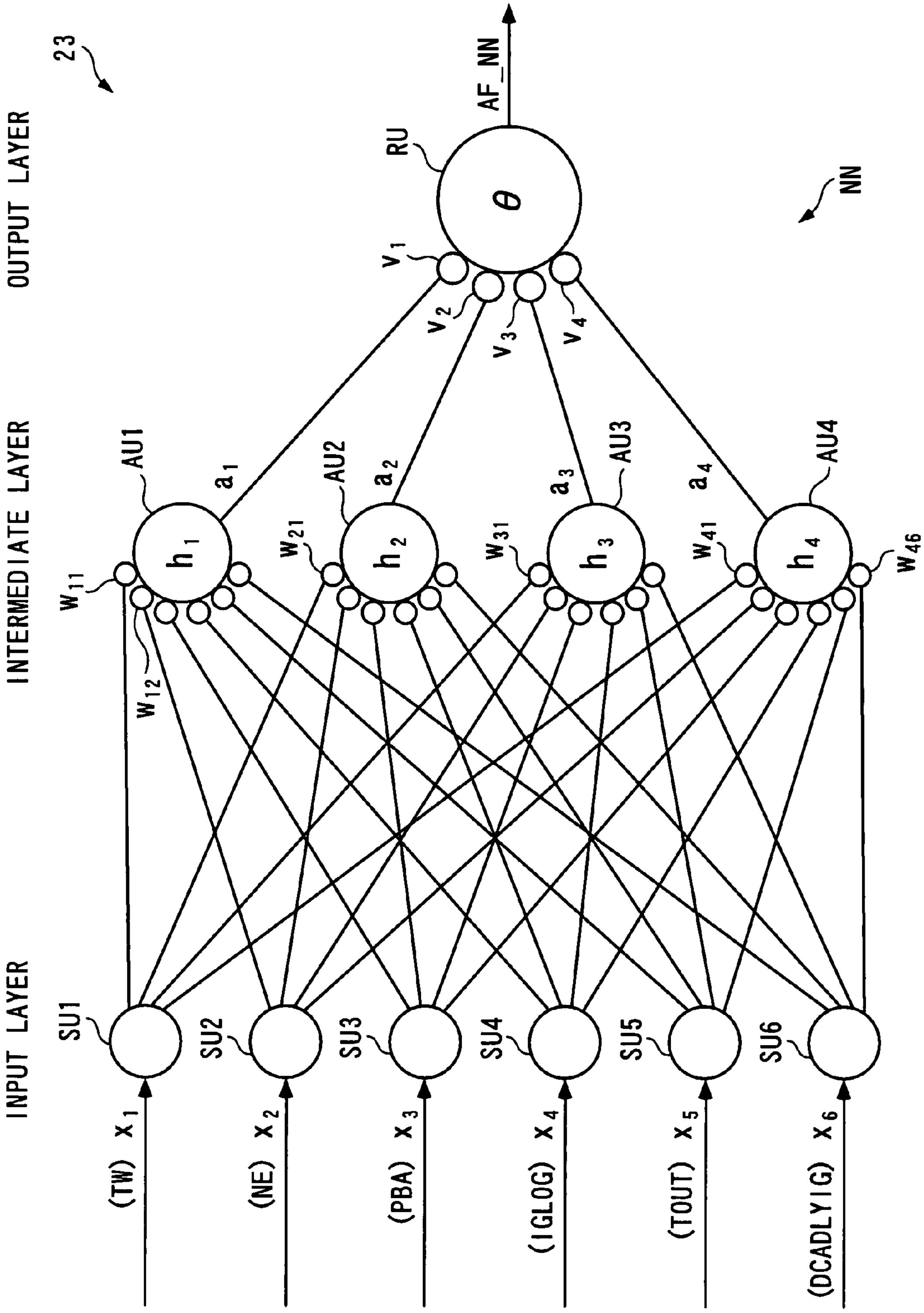
FIG. 5 is a schematic diagram of a neural network of a first estimated air-fuel ratio-calculating section.

As shown in FIG. 5, the first estimated air-fuel ratio-calculating section 23 is formed by a three-layered hierarchical neural network NN comprised of an input layer, an intermediate layer, and an output layer. The input layer has first to sixth input units SU1 to SU6, the intermediate layer first to fourth intermediate units AU1 to AU4, and the output layer an output layer RU. The. input units SU1 to SU6 are connected to the first to fourth intermediate units AU1 to AU4 via connection weights $w_{11}$ to $w_{16}$, $w_{21}$ to $w_{26}$, $w_{31}$ to $w_{36}$, and $w_{41}$ to $w_{46}$ (In FIG. 5, reference numerals of part of the connection weights $w_{11}$ to $w_{46}$ are omitted for convenience). The intermediate units AU1 to AU4 are connected to the output unit RU via respective connection weights $v_1$ to $V_4$. It should be noted that neither the input units SU1 to SU6 nor the intermediate units AU1 to AU4 are connected to each other. In the present embodiment, the connection weights $w_{11}$ to $w_{46}$ and $v_1$ to $V_4$ correspond to parameters used in the neural network.

In the neural network NN configured as above, the six input parameters of the engine coolant temperature TW, the engine speed NE, the intake pipe pressure PBA, the ignition timing IGLOG, the fuel injection amount TOUT, and the ignition delay DCADLYIG are input to the first to sixth input units SU1 to SU6 as inputs $x_1$ to $x_6$, respectively. The above-described six parameters are used as the input parameters since they have a close correlation with the exhaust air-fuel ratio. Particularly, the ignition delay DCADLYIG is used for the following reason: As fuel is difficult to burn, the ignition delay DCADLYIG becomes larger, and the amount of unburned oxygen contained in exhaust gases increases, so that the exhaust air-fuel ratio tends to change toward the leaner side.

The input units SU1 to SU6 output the inputs $x_1$ to $x_6$ to the intermediate units AU1 to AU4 without processing. The intermediate units AU1 to AU4 calculate first to fourth intermediate outputs $a_1$ to $a_4$ using the following equation (10), based on the inputs $x_1$ to $x_6$, respectively, and output them to the output unit RU.

$$a_j = f_a\left(\sum_{i=1}^{6} x_i \cdot w_{ji} - h_j\right) \tag{10}$$

wherein j represents a value of 1 to 4, and $h_j$ a predetermined threshold value. Further, $f_a$ represents an output function, and a sigmoid function is used as the output function $f_a$, for example. As expressed by the equation (10), the intermediate output $a_j$ is calculated by substituting a value obtained by subtracting the threshold value $h_j$ from the total sum of products each obtained by multiplying the input $x_1$ (i=1 to 6) by a connection weight $w_{ji}$, into the output function $f_a$. In the present embodiment, the threshold value $h_j$ corresponds to a parameter used in the neural network.

The output unit RU calculates the first estimated air-fuel ratio AF_NN based on the input intermediate outputs $a_1$ to $a_4$ using the following equation (11).

$$\text{AF\_NN} = f_r\left(\sum_{j=1}^{4} a_j \cdot v_j - \theta\right) \tag{11}$$

wherein θ represents a predetermined threshold value, and $f_r$ an output function. Similarly to the output function $f_a$, a sigmoid function is used as the output function $f_r$, for example. As expressed by the equation (11), the first estimated air-fuel ratio AF_NN is calculated by substituting a value obtained by subtracting the threshold value θ from the total sum of products each obtained by multiplying the intermediate output $a_j$ by the connection weight $v_j$, into the output function $f_r$. In the present embodiment, the threshold value θ corresponds to a parameter used in the neural network.

The connection weights $w_{ji}$ and $v_j$, and the threshold values $h_j$and θ are set to respective predetermined fixed values. These fixed values are set in advance as follows: The exhaust air-fuel ratio is calculated based on oxygen concentration in exhaust gases, detected e.g. by a sensor, and learning is performed by a back propagation method using the calculated oxygen concentration as a teacher signal, whereby the fixed values are set in advance.

It should be noted that to calculate the first estimated air-fuel ratio AF_NN, parameters which are obtained before dead time d are used as the six input parameters including the engine coolant temperature TW. The dead time d is set to a time period taken before exhaust gases reach the LAF sensor 16.

The disturbance observer 24 calculates first and second correction values K1_NNR and C1_NNR for correcting the first estimated air-fuel ratio AF_NN, based on the first estimated air-fuel ratio AF_NN and the detected air-fuel ratio AF_ACT, input thereto, and delivers them to the final estimated air-fuel ratio-calculating section 25. In the present embodiment, the disturbance observer 24 corresponds to the correction means, the correction value-calculating means, and the identification means, and the first and second correction values K1_NNR and C1_NNR to the correction value and the model parameter.

The first and second correction values KL_NNR and C1_NNR are calculated based on the following concept: As described above, the connection weights $w_{ji}$ and $v_j$, and the threshold values $h_j$ and θ used in the neural network NN for calculation of the first estimated air-fuel ratio AF_NN are set to fixed values, and therefore when the relationship between the inputs and the output, that is, between the fuel injection amount TOUT, the ignition delay DCADLYIG, and so forth, and the first estimated air-fuel ratio AF_NN is changed by the aging changes of the engine 3, and the aging of the sensors, there is a fear that the AF_NN value deviates from an actual exhaust air-fuel ratio to drift. To avoid this problem, the first and second correction values K1_NNR and C1_NNR for correcting the drift of the AF_NN value are calculated using the detected air-fuel ratio AF_ACT and the first estimated air-fuel ratio AF_NN obtained when the LAF sensor 16 is active.

The relationship between the first estimated air-fuel ratio AF_NN and an identified value AF_NNHAT is defined as expressed by the following equation (12). The identified value AF_NNHAT represents the first estimated air-fuel ratio AF_NN which has been corrected for drift.

$$AF\_NNHAT(k)=K1\_NN(k)\cdot AF\_NN(k)+C1\_NN(k) \tag{12}$$

It should be noted that the symbol k in the equation (12) represents a discretized time, and discrete data with the symbol (k) indicates that it is data calculated or sampled in timing synchronous with generation of each pulse of the TDC signal. This also applies to discrete data (time-series data) referred to hereinafter. Further, in the following, the symbol (k) is omitted as deemed appropriate.

First, a vector θ_NN(k) of model parameters K1_NN(k) and C1_NN(k) of the equation (12) is identified by the sequential least-squares method expressed by the following equations (13) to (19):

$$\theta\_\mathrm{NN}(k) = \theta\_\mathrm{NN}(k-1) + \mathrm{KP\_NN}(k)\cdot \mathrm{e\_NN}(k) \tag{13}$$

$$\theta\_\mathrm{NN}(k)^T = [K1\_\mathrm{NN}(k)\ \ C1\_\mathrm{NN}(k)] \tag{14}$$

$$\mathrm{e\_NN}(k) = \mathrm{AF\_NNHAT}(k) - \mathrm{AF\_ACT}(k) \tag{15}$$

$$\mathrm{AF\_NNHAT}(k) = \theta\_\mathrm{NN}(k-1)^T \cdot \zeta\_\mathrm{NN}(k) \tag{16}$$

$$\zeta\_\mathrm{NN}(k)^T = [\mathrm{AF\_NN}(k)\ \ 1] \tag{17}$$

-continued $$\mathrm{KP\_NN}(k) = \frac{\mathrm{P\_NN}(k)\cdot\zeta\_\mathrm{NN}(k)}{1+\zeta\_\mathrm{NN}(k)^T\cdot\mathrm{P\_NN}(k)\cdot\zeta\_\mathrm{NN}(k)} \tag{18}$$

$$\mathrm{P\_NN}(k+1) = \frac{1}{\lambda_1}\cdot\left(I - \frac{\lambda_2\cdot\mathrm{P\_NN}(k)\cdot\zeta\_\mathrm{NN}(k)\cdot\zeta\_\mathrm{NN}(k)^T}{\lambda_1+\lambda_2\cdot\zeta\_\mathrm{NN}(k)^T\cdot\mathrm{P\_NN}(k)\cdot\zeta\_\mathrm{NN}(k)}\right)\cdot\mathrm{P\_NN}(k) \tag{19}$$

$I$: UNIT MATRIX $\lambda_1, \lambda_2$: WEIGHT PARAMETER

In the equation (13), KP_NN(k) represents a vector of a gain coefficient, and e_NN(k) represents an identification error. θ_NN(k)$^T$ in the equation (14) represents a transposed matrix of the vector θ_NN(k) The identification error e_NN (k) in the equation (13) is calculated by the equation (15), and ζ_NN(k) in the equation (16) represents a vector the transposed matrix of which is represented by the equation (17). Further, the vector KP_NN(k) of the gain coefficient is calculated by the equation (18). P_NN(k) in the equation (18) represents a square matrix of order 2 defined by the equation (19).

The vector θ_NN is calculated with the algorithm expressed by the equations (13) to (19) such that the identification error e_NN is minimized, i.e. the identified value AF_NNHAT becomes equal to the detected air-fuel ratio AF_ACT.

Then, first and second correction values K1_NNR(k) and C1_NNR(k) are calculated using the determined model parameters K1_NN(k) and C1_NN(k) by the following equations (20) and (21):

$$K1\_NNR(k)=\alpha\cdot K1\_NN(k)+(1-\alpha)\cdot K1\_NNR(k-1) \tag{20}$$

$$C1\_NNR(k)=\beta\cdot C1\_NN(k)+(1-\beta)\cdot C1\_NNR(k-1) \tag{21}$$

wherein αand β are predetermined weighting coefficients ($0<\alpha<1$, $0<\beta<1$). As described above, the first and second correction values K1_NNR(k) and C1_NNR(k) are calculated by learning the model parameters K1_NN and C1_NN, respectively.

The final estimated air-fuel ratio-calculating section 25 stores the first and second correction values K1_NNR and C1_NNR input thereto, in the EEPROM 2*a*, and when the LAF sensor 16 is not active, the final estimated air-fuel ratio-calculating section 25 calculates a final estimated air-fuel ratio AF_NNF by the following equation (22) using the input first estimated air-fuel ratio AF_NN, and the stored first and second correction values K1_NNR and C1_NNR to output the final estimated air-fuel ratio AF_NNF to the fuel injection amount-calculating section 26. In the present embodiment, the final estimated air-fuel ratio-calculating section 25 corresponds to the correction means, the correction value-storing means, the corrected estimated exhaust gas state parameter-calculating means, and the model parameter-storing means, and the final estimated air-fuel ratio AF_NNF corresponds to a corrected estimated exhaust gas state parameter.

$$AF\_NNF(k)=K1\_NNR(k)\cdot AF\_NN(k)+C1\_NNR(k) \tag{22}$$

As described above, the model parameters K1_NN and C1_NN in the equation (12) are identified such that the identified value AF_NNHAT becomes equal to the detected air-fuel ratio AF_ACT which is obtained with very high accuracy when the LAF sensor is active. Therefore, it can be the that the model parameters K1_NN and C1_NN are identified such that the identified value AF_NNHAT becomes equal to the actual exhaust air-fuel ratio. Therefore, the drift of the first estimated air-fuel ratio AF_NN, caused by disturbance, can be properly corrected by the equation (22) which is obtained by replacing the AF_NNHAT value, the K1_NN value, and the C1_NN value in the equation (12) by the final estimated air-fuel ratio AF_NNF, and the first and second correction values K1_NNR and C1_NNR, which are learned values of the K1_NN value and the C1_NN value, respectively. This makes it possible to accurately calculate the final estimated air-fuel ratio AF_NNF as the exhaust air-fuel ratio.

Further, the model parameters K1_NN and C1_NN are not used as they are, for the first and second correction values K1_NNR and C1_NNR, but the learned values thereof are used for the same, so that it is possible to accurately calculate the final estimated air-fuel ratio AF_NNF while suppressing adverse influence of noises temporarily contained in the output from the LAF sensor 16.

Figure 6A:
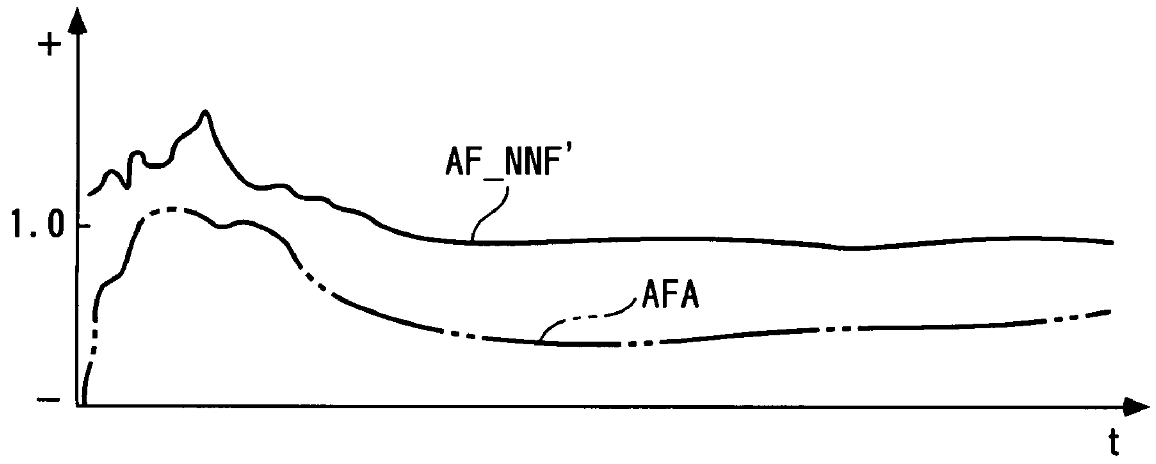
FIG. 6A is a diagram showing an example of changes in a final estimated air-fuel ratio calculated without using the ignition delay as an input.
Figure 6B:
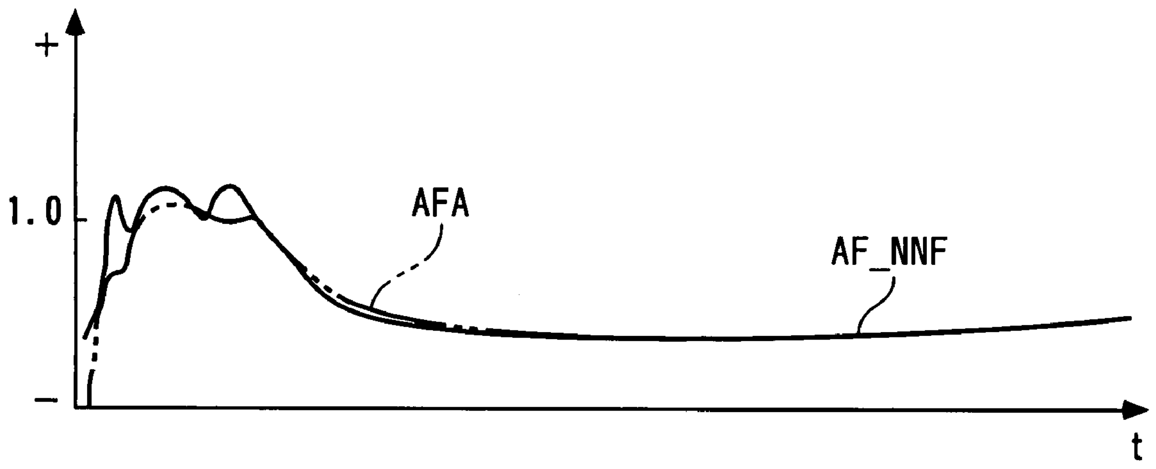
FIG. 6B is a diagram showing an example of changes in a final estimated air-fuel ratio calculated by the air-fuel ratio control system according to the present embodiment.

FIGS. 6A and 6B show examples of changes in the final estimated air-fuel ratio AF_NNF, which are caused when fuel difficult to burn is used, together with a comparative example. The comparative example AF_NNF' shown in FIG. 6A illustrates changes in the final estimated air-fuel ratio calculated without using the ignition delay DCADLYIG as the input parameter. In both the illustrated examples, the actual exhaust air-fuel ratio AFA is relatively lean since the fuel is difficult to burn. In contrast, the comparative example, i.e. the final estimated air-fuel ratio AF_NNF', is calculated without using the ignition delay DCADLYIG, and hence the difference between the properties of fuel is not reflected on the calculation, so that the final estimated air-fuel ratio AF_NNF' largely deviates toward the richer side with respect to the actual exhaust air-fuel ratio AFA.

On the other hand, as shown in FIG. 6B, the final estimated air-fuel ratio AF_NNF calculated by the air-fuel ratio control system 1 is substantially equal to the actual exhaust air-fuel ratio AFA with little error, and therefore its accuracy is very high.

The fuel injection amount-calculating section 26 calculates the fuel injection amount TOUT based on the detected air-fuel ratio AF_ACT when the LAF sensor 16 is active, whereas when the LAF sensor 16 is not active, it calculates the fuel injection amount TOUT based on the final estimated air-fuel ratio AF_NNF input thereto. Detailed description thereof will be given hereinafter. In the present embodiment, the fuel injection amount-calculating section 26 corresponds to the air-fuel ratio control means.

Figure 7:
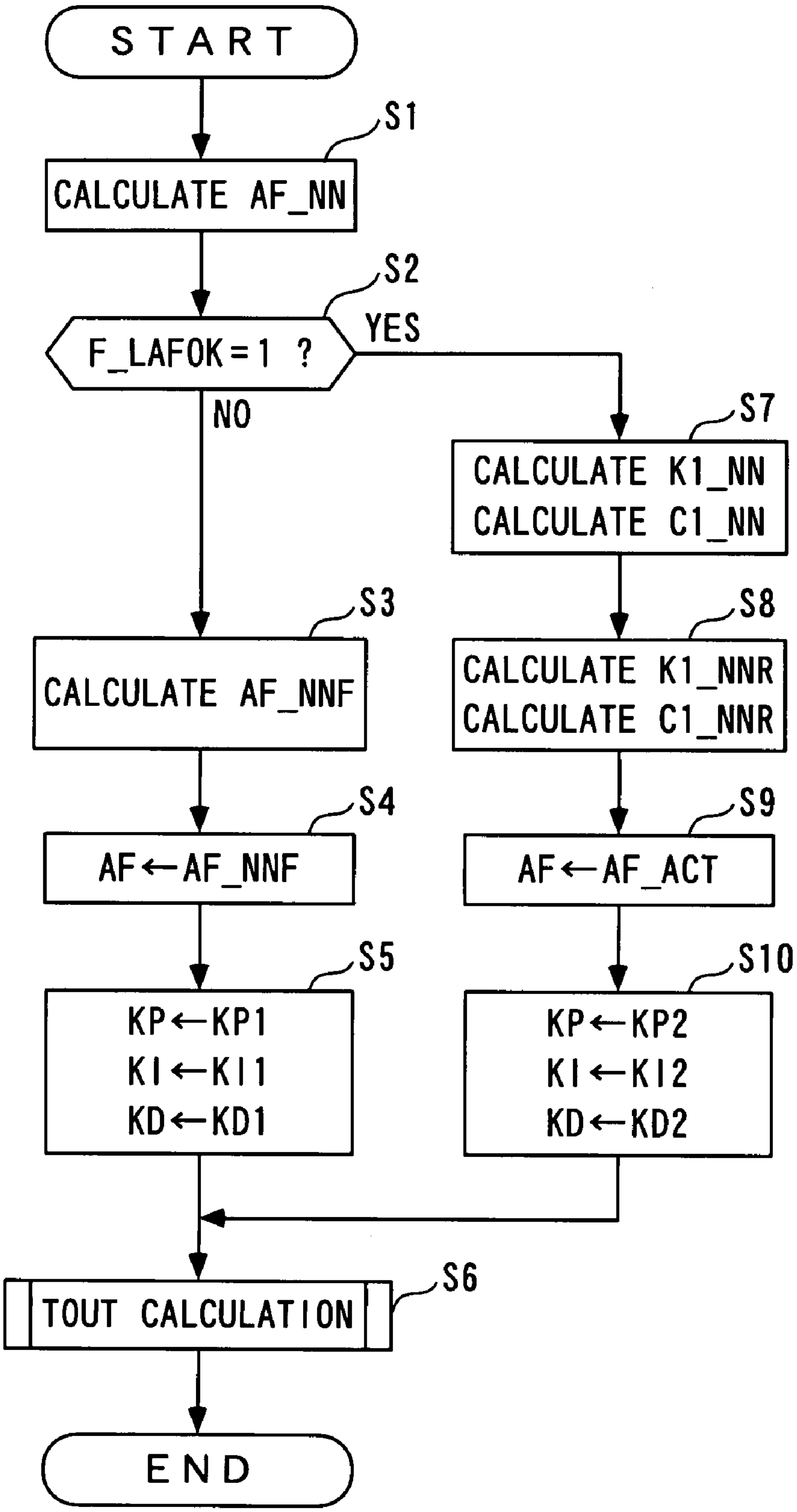
FIG. 7 is a flowchart showing a fuel injection control process.
Figure 8:
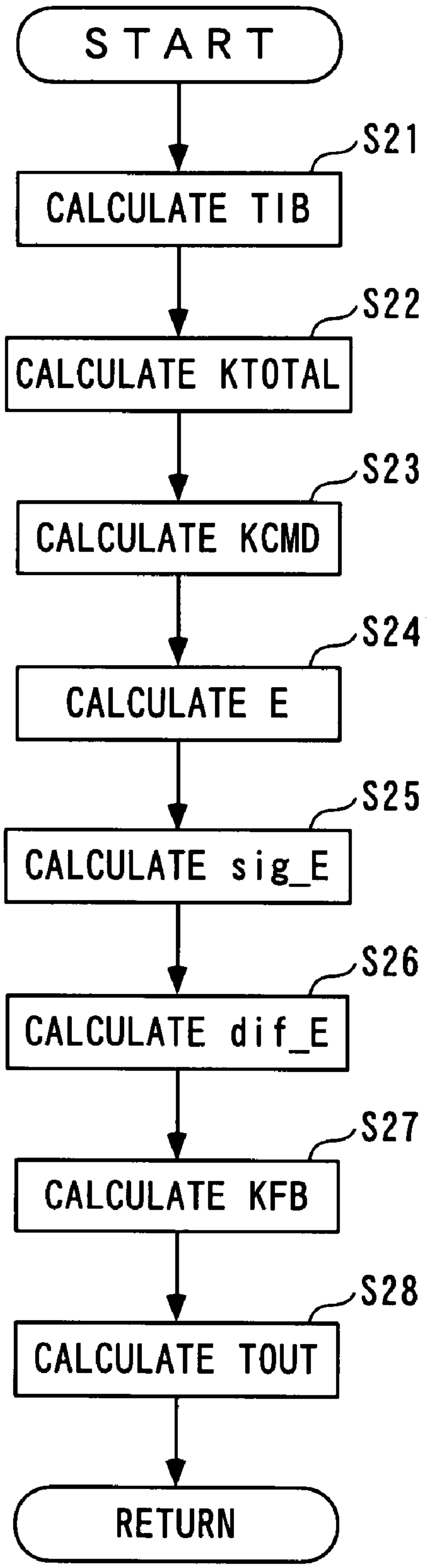
FIG. 8 is a flowchart showing a subroutine of a TOUT-calculating process appearing in FIG. 7.

Hereinafter, a fuel injection control process including the calculation of the final estimated air-fuel ratio AF_NNF, which is carried out by the ECU 2, will be described with reference to FIGS. 7 and 8. FIG. 7 shows a main routine of the control process which is executed in synchronism with input of each TDC signal pulse.

First, in a step 1 (shown as S1 in abbreviated form in FIG. 7; the following steps are also shown in abbreviated form), the first estimated air-fuel ratio AF_NN is calculated by the equations (10) and. (11), as described above. Then, it is determined whether or not an active state flag F_LAFOK is equal to 1 (step 2). For example, when the difference between an output voltage of the LAF sensor 16 and a center voltage thereof is smaller than a predetermined value (e.g. 0.4 V), it is judged that the LAF sensor 16 is active, and the active state flag F_LAFOK is set to 1.

If the answer to this question is negative (NO), i.e. if the LAF sensor 16 is not active, the final estimated air-fuel ratio AF_NNF is calculated by the aforementioned equation (22) (step 3). It should be noted that in calculating the final estimated air-fuel ratio AF_NNF, the first and second correction values K1_NNR and C1_NNR, which are stored in the EEPROM 2_a_, are used. Then, the calculated final estimated air-fuel ratio AF_NNF is set to a final air-fuel ratio AF to be used for air-fuel ratio feedback control, described hereinafter (step 4). Next, a P-term gain KP, an I-term gain KI, and a D-term gain KD for use in the air-fuel ratio feedback control are set to first predetermined values KP1, KI1, and KD1, respectively (step 5), and a TOUT-calculating process is executed (step 6), followed by terminating the present process. It should be noted that in the present embodiment, the first predetermined values KP1, KI1, and KD1 correspond to first predetermined feedback gains.

On the other hand, if the answer to the question of the step 2 is affirmative (YES), i.e. if the LAF sensor 16 is active, the model parameters K1_NN and C1_NN are calculated (identified) based on the detected air-fuel ratio AF_ACT and the first estimated air-fuel ratio AF_NN calculated in the step 1, by the aforementioned equations (13) to (19) (step 7). Then, the first and second correction values K1_NNR and C1_NNR are calculated using the calculated model parameters K1_NN and C1_NN, by the aforementioned equations (20) and (21), respectively (step 8).

Then, the detected air-fuel ratio AF_ACT is set to the final air-fuel ratio AF (step 9), and the P-term gain KP, the I-term gain KI, and the D-term gain KD are set to second predetermined values KP2, KI2, and KD2, respectively (step 10), followed by executing the step 6. The second predetermined values KP2, KI2, and KD2 are set to values larger than the aforementioned first predetermined values KP1, KI1, and KD1, respectively. It should be noted that in the present embodiment, the second predetermined values KP2, KI2, and KD2 correspond to second predetermined feedback gains. Further, the steps 4 to 6, 9, and 10 correspond to the processes carried out by the fuel injection amount-calculating section 26.

Next, the TOUT-calculating process in the step 6 will be described with reference to FIG. 8. First, in a step 21, a basic fuel injection amount TIB is calculated e.g. by searching a map, not shown, according to the engine speed NE and the intake pipe pressure PBA. Then, a total correction coefficient KTOTAL is calculated (step 22). The total correction coefficient KTOTAL is calculated according to correction terms determined according to the intake air temperature TA and the engine coolant temperature TW.

Then, a target air-fuel ratio KCMD is calculated (step 23). The target air-fuel ratio KCMD is determined by correcting a basic value, which is determined by searching a map, not shown, according to the engine speed NE and a demanded torque PMCMD, e.g. using the engine coolant temperature TW. It should be noted that the target air-fuel ratio KCMD is calculated as an equivalent ratio. In the present embodiment, the target air-fuel ratio KCMD corresponds to a predetermined target value. Further, the demanded torque PMCMD is calculated by searching a map, not shown, according to the engine speed NE and the accelerator opening AP.

Then, the difference E(k) between the final air-fuel ratio AF set in the step 4 or 9, and the target air-fuel ratio KCMD calculated in the step 23 is calculated (step 24). After that, a cumulative value sig_E(k) of the difference E(k) is calculated by adding the current difference E(k) to the immediately preceding value sig_E(k−1) of the cumulative value (step 25), and the amount dif_E(k) of change in the difference is calculated by subtracting the immediately preceding value E(k−1) of the difference E(k) from the difference E(k) (step 26).

Then, an F/B correction coefficient KFB is calculated by the following equation (23), using the difference E(k), the cumulative value sig_E(k), and the amount dif_E(k) of change in the difference, which are calculated in the steps 24 to 26, respectively, and the P-term gain KP, the I-term gain KI, and the D-term gain KD, which are set in the step 5 or 10 (step 27).

$$KFB=FLAFBASE-KP(k)\cdot E(k)-KI(k)\cdot sig\_E(k)-KD(k)\cdot \text{dif}\_E(k) \quad (23)$$

wherein FLAFBASE represents a predetermined basic value.

Next, the fuel injection amount TOUT is calculated by multiplying the basic fuel injection amount TIB calculated as above, by the total correction coefficient KTOTAL, the target air-fuel ratio KCMD, and the F/B correction coefficient KFB (step 28), followed by terminating the present process. The fuel injection amount TOUT is calculated, as described above, whereby the air-fuel ratio is feedback-controlled such that the exhaust air-fuel ratio becomes equal to the target air-fuel ratio KCMD.

As described hereinabove, according to the present embodiment, the neural network NN is configured in advance as a network to which are input the ignition delay DCADLYIG, the engine coolant temperature TW, the engine speed NE, the intake pipe pressure PBA, the ignition timing IGLOG, and the fuel injection amount TOUT, and in which the exhaust air-fuel ratio is used as a teacher signal, and the above input parameters detected are input to the neural network NN, whereby the first estimated air-fuel ratio AF_NN is calculated. Therefore, the first estimated air-fuel ratio AF_NN can be accurately estimated as the exhaust air-fuel ratio, according to the properties of fuel.

Further, since the relationship between the ignition delay DCADLYIG, the fuel injection amount TOUT, and so forth, and the first estimated air-fuel ratio AF_NN is modeled using the neural network NN, the modeling can be performed easily. Furthermore, the ignition delay DCADLYIG, the fuel injection amount TOUT, and so forth, which have high correlation with the exhaust air-fuel ratio, are used as inputs to the neural network NN, whereby it is possible to simplify the model. Therefore, in the present embodiment, the number of the intermediate units AU1 to AU4 of the intermediate layer in the neural network NN is set to 4, which is a relatively small number, whereby it is possible to reduce computation load on the air-fuel ratio control system 1.

Further, since the ignition delay DCADLYIG is calculated based on the output DPV from the in-cylinder pressure sensor 15, it is possible to perform the calculation accurately, thereby making it possible to estimate the first estimated air-fuel ratio AF_NN with higher accuracy. Furthermore, since the existing in-cylinder pressure sensor 15 is employed, there is no need to provide a new component, thereby making it possible to suppress the manufacturing costs of the air-fuel ratio control system 1. Further, the connection weights $w_{ji}$ and $v_j$, and the threshold values $h_j$ and θ used in the neural network NN are set to the predetermined fixed values, and therefore it is possible to further reduce the computation load on the air-fuel ratio control system 1.

Further, when the LAF sensor 16 is not active (NO to the step 2), and the detected air-fuel ratio AF_ACT with sufficient accuracy cannot be obtained, the air-fuel ratio is feedback-controlled such that the final estimated air-fuel ratio AF_NNF becomes equal to the target air-fuel ratio KCMD (steps 4, and 24 to 28), so that the air-fuel ratio can be properly controlled, thereby making it possible to reduce exhaust emissions as desired. Further, when the LAF sensor 16 is active, the air-fuel ratio is feedback-controlled such that the detected air-fuel ratio AF_ACT becomes equal to the target air-fuel ratio KCMD (steps 9, and 24 to 28), and hence the air-fuel ratio can be properly controlled, similarly.

Further, when the air-fuel ratio feedback control using the final estimated air-fuel ratio AF_NNF is performed, the P-term gain KP, the I-term gain KI, and the D-term gain KD are set to the first predetermined values KP1, KI1, and KD1, which are the smaller ones, respectively (step 5). This makes it possible to perform stable air-fuel ratio control. Further, when the air-fuel ratio feedback control using the detected air-fuel ratio AF_ACT is performed, the P-term gain KP, the I-term gain KI, and the D-term gain KD are set to the second predetermined values KP2, KI2, and KD2, which are the larger ones, respectively (step 10). This makes it possible to converge the exhaust air-fuel ratio to the target air-fuel ratio KCMD quickly and stably.

Further, the model parameters K1_NN and C1_NN of the model (equation (12)) defining the relationship between the identified value AF_NNHAT and the first estimated air-fuel ratio AF_NN are identified based on the detected air-fuel ratio AF_ACT and the first estimated air-fuel ratio AF_NN, which are obtained when the LAF sensor 16 is active, such that the AF_NNHAT value becomes equal to the AF_ACT value (step 7). Further, by learning the K1_NN value and the C1_NN value, the first and second correction values K1_NNR and C1_NNR are calculated (step 8), and the final estimated air-fuel ratio AF_NNF is calculated using the equation (22) obtained by replacing the AF_NNHAT value, the K1_NN value, and the C1_NN value in the equation (12) by the final estimated air-fuel ratio AF_NNF, and the correction values K1_NNR and C1_NNR, respectively (step 3). Therefore, even when the first estimated air-fuel ratio AF_NN is drifted by a disturbance caused e.g. by the aged characteristics of the engine 3, it is possible to properly correct the drift, thereby making it possible to accurately calculate the final estimated air-fuel ratio AF_NNF.

Furthermore, the first and second correction values K1_NNR and C1_NNR are stored in the EEPROM 2*a*, and when the LAF sensor 16 is not active, i.e. during the next start of the engine 3, the final estimated air-fuel ratio AF_NNF is calculated using the stored K1_NNR value and the C1_NNR value. This makes it possible to obtain a corrected and accurate final estimated air-fuel ratio AF_NNF, when the LAF sensor 16 is not active, and the detected air-fuel ratio AF_ACT cannot be obtained with sufficient accuracy.

It should be noted that the present invention is by no means limited to the above-described embodiment, but it can be practiced in various forms. For example, although in the above-described embodiment, the ignition delay DCADLYIG is used as the combustion state parameter indicative of the combustion state of the air-fuel mixture in the engine 3, this is not limitative, but other appropriate parameters, such as the maximum value of the in-cylinder pressure in one combustion cycle, timing and combustion temperature at which the maximum value can be obtained, and so forth, may be used. Further, although a hierarchical neural network is used as the neural network NN, an interconnection neural network may be employed.

Furthermore, although the connection weights $w_{ji}$ and $v_j$, and the threshold values $h_j$ and θ are set to the predetermined fixed values, these parameters may be learned e.g. by the back propagation method using the detected air-fuel ratio AF_ACT, which is obtained when the LAF sensor 16 is active, as a teacher signal, as required. In this case, the first estimated air-fuel ratio AF_NN can be estimated with accuracy e.g. based on the aging changes of the engine 3 and the aging of sensors for detecting the input parameters, so that the air-fuel ratio may be feedback-controlled directly using the first estimated air-fuel ratio AF_NN without correction, or the disturbance observer 24 and the final estimated air-fuel ratio-calculating section 25 may be omitted.

Further, although the exhaust air-fuel ratio is estimated as the exhaust gas state parameter indicative of the state of exhaust gases, another appropriate parameter, such as the oxygen concentration, the HC concentration, the CO concentration, or the NOx concentration in exhaust gases, may be estimated. Furthermore, the method of correcting the first estimated air-fuel ratio AF_NN is not limited to the above-described method, but another appropriate method may be employed. For example, the first estimated air-fuel ratio AF_NN may be corrected by calculating the difference between the detected air-fuel ratio AF_ACT and the first estimated air-fuel ratio AF_NN as a correction value when the LAF sensor 16 is active, storing the calculated correction value in a manner associated with the operating state of the engine 3 at that time, and using one of a plurality of the stored correction values, corresponding to the current operating state.

Further, although in the above-described embodiment, the sequential least-squares method algorithm in which both the weight parameters $\lambda_1$ and $\lambda_2$ are to 1 is used as an algorithm for identifying the model parameters K1_NN and C1_NN, this is not limitative, but there may be used another appropriate algorithm, such as a progressively decreasing gain algorithm in which the weight parameters are set such that $\lambda_1=1$ and $\lambda_{2=\lambda}(0<\lambda<1)$ hold, or a weighted least-squares method algorithm in which the weight parameters are set such that $\lambda_1=\lambda$ and $\lambda_2=1$ hold. Furthermore, although in the above-described embodiment, the learned values of the model parameters K1_NN and C1_NN are used as the first and second correction values K1_NNR and C1_NNR, the model parameters K1_NN and C1_NN may be used without correction.

Although in the above-described embodiments, the present invention is applied to the automotive gasoline engine by way of example, this is not limitative, but it can be applied to various types of engines, such as diesel engines and engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An air-fuel ratio control system for an internal combustion engine, for controlling an air-fuel ratio of a mixture supplied to the engine, comprising:

combustion state parameter-detecting means for detecting a combustion state parameter indicative of a combustion state of the mixture in the engine;

operating state parameter-detecting means for detecting an operating state parameter indicative of an operating state of the engine;

exhaust gas state parameter-estimating means for estimating an exhaust gas state parameter indicative of a state of exhaust gases emitted from the engine, as an estimated exhaust gas state parameter, by inputting the detected combustion state parameter and the detected operating state parameter to a neural network configured as a neural network to which are input the combustion state parameter and the operating state parameter, and in which the exhaust gas state parameter is used as a teacher signal; and air-fuel ratio control means for controlling the air-fuel ratio based on the estimated exhaust gas state parameter.

2. An air-fuel ratio control system as claimed in claim 1, wherein said combustion state parameter-detecting means detects the combustion state parameter based on an output from an in-cylinder pressure sensor for detecting pressure within a cylinder of the engine.

3. An air-fuel ratio control system as claimed in claim 1, wherein the parameters used in the neural network are set to predetermined values.

4. An air-fuel ratio control system as claimed in claim 1, further comprising:

an exhaust gas state parameter sensor for detecting the exhaust gas state parameter as a detected exhaust gas state parameter; and sensor active state-determining means for determining whether said exhaust gas state parameter sensor is active, wherein said air-fuel ratio control means performs first feedback control for feedback-controlling the air-fuel ratio such that the estimated exhaust gas state parameter becomes equal to a predetermined target value, when said exhaust gas state parameter sensor is not active, and second feedback control for feedback-controlling the air-fuel ratio such that the detected exhaust gas state parameter becomes equal to the predetermined target value, when said exhaust gas state parameter sensor is active.

5. An air-fuel ratio control system as claimed in claim 4, wherein said air-fuel ratio control means performs the first feedback control and the second feedback control, using first and second predetermined feedback gains which are different from each other, respectively.

6. An air-fuel ratio control system as claimed in claim 1, further comprising:

an exhaust gas state parameter sensor for detecting the exhaust gas state parameter as a detected exhaust gas state parameter;

sensor active state-determining means for determining whether said exhaust gas state parameter sensor is active; and correction means for correcting deviation of the estimated exhaust gas state parameter from the detected exhaust gas state parameter, according to the detected exhaust gas state parameter obtained when said exhaust gas state parameter sensor is active and the estimated exhaust gas state parameter.

7. An air-fuel ratio control system as claimed in claim 6, wherein said correction means comprises:

correction value-calculating means for calculating a correction value based on the detected exhaust gas state parameter obtained when said exhaust gas state parameter sensor is active and the estimated exhaust gas state parameter; and correction value-storing means for storing the calculated correction value, and wherein said correction means corrects the estimated exhaust gas state parameter obtained when said exhaust gas state parameter sensor is not active, based on the stored correction value.

8. An air-fuel ratio control system as claimed in claim 6, wherein said correction means comprises:

corrected estimated exhaust gas state parameter-calculating means for calculating a corrected estimated exhaust gas state parameter, based on a model defining a relationship between the corrected estimated exhaust gas state parameter which is obtained by correcting the estimated exhaust gas state parameter and the estimated exhaust gas state parameter; and identification means for identifying a model parameter of the model, based on the detected exhaust gas state parameter obtained when said exhaust gas state parameter sensor is active and the estimated exhaust gas state parameter, such that the corrected estimated exhaust gas state parameter becomes equal to the detected exhaust gas state parameter, wherein said air-fuel ratio control means controls the air-fuel ratio, using the corrected estimated exhaust gas state parameter as the estimated exhaust gas state parameter.

9. An air-fuel ratio control system as claimed in claim 8, wherein said correction means further comprises model parameter-storing means for storing the model parameter, and wherein said corrected estimated exhaust gas state parameter-calculating means calculates the corrected estimated exhaust gas state parameter based on the model using the stored model parameter, when said exhaust gas state parameter sensor is not active.

10. An engine control unit including a control program for causing a computer to control an air-fuel ratio of a mixture supplied to an internal combustion engine, wherein the control program causes the computer to detect a combustion state parameter indicative of a combustion state of the mixture in the engine, detect an operating state parameter indicative of an operating state of the engine, estimate an exhaust gas state parameter indicative of a state of exhaust gases emitted from the engine, as an estimated exhaust gas state parameter, by inputting the detected combustion state parameter and the detected operating state parameter to a neural network configured as a neural network to which are input the combustion state parameter and the operating state parameter, and in which the exhaust gas state parameter is used as a teacher signal, and control the air-fuel ratio based on the estimated exhaust gas state parameter.

11. An engine control unit as claimed in claim 10, wherein the control program causes the computer to detect the combustion state parameter based on an output from an in-cylinder pressure sensor for detecting pressure within a cylinder of the engine.

12. An engine control unit as claimed in claim 10, wherein the parameters used in the neural network are set to predetermined values.

13. An engine control unit as claimed in claim 10, wherein the control program further causes the computer to determine whether an exhaust gas state parameter sensor for detecting the exhaust gas state parameter as a detected exhaust gas state parameter is active, and causes the computer to perform first feedback control for feedback-controlling the air-fuel ratio such that the estimated exhaust gas state parameter becomes equal to a predetermined target value, when the exhaust gas state parameter sensor is not active, and second feedback control for feedback-controlling the air-fuel ratio such that the detected exhaust gas state parameter becomes equal to the predetermined target value, when the exhaust gas state parameter sensor is active.

14. An engine control unit as claimed in claim 13, wherein the control program causes the computer to perform the first feedback control and the second feedback control, using first and second predetermined feedback gains which are different from each other, respectively.

15. An engine control unit as claimed in claim 10, wherein the control program further causes the computer to determine whether an exhaust gas state parameter sensor for detecting the exhaust gas state parameter as a detected exhaust gas state parameter is active, and correct deviation of the estimated exhaust gas state parameter from the detected exhaust gas state parameter, according to the detected exhaust gas state parameter obtained when the exhaust gas state parameter sensor is active and the estimated exhaust gas state parameter.

16. An engine control unit as claimed in claim 15, wherein the control program causes the computer to calculate a correction value based on the detected exhaust gas state parameter obtained when the exhaust gas state parameter sensor is active and the estimated exhaust gas state parameter, store the calculated correction value, and correct the estimated exhaust gas state parameter obtained when the exhaust gas state parameter sensor is not active, based on the stored correction value.

17. An engine control unit as claimed in claim 15, wherein the control program causes the computer to calculate a corrected estimated exhaust gas state parameter, based on a model defining a relationship between the corrected estimated exhaust gas state parameter which is obtained by correcting the estimated exhaust gas state parameter and the estimated exhaust gas state parameter, identify a model parameter of the model, based on the detected exhaust gas state parameter obtained when the exhaust gas state parameter sensor is active and the estimated exhaust gas state parameter, such that the corrected estimated exhaust gas state parameter becomes equal to the detected exhaust gas state parameter, and control the air-fuel ratio, using the corrected estimated exhaust gas state parameter as the estimated exhaust gas state parameter.

18. An engine control unit as claimed in claim 17, wherein the control program causes the computer to store the model parameter, and calculate the corrected estimated exhaust gas state parameter based on the model using the stored model parameter, when the exhaust gas state parameter sensor is not active.

19. A method of controlling an air-fuel ratio of a mixture supplied to an internal combustion engine, comprising:

a combustion state parameter-detecting step of detecting a combustion state parameter indicative of a combustion state of the mixture in the engine;

an operating state parameter-detecting step of detecting an operating state parameter indicative of an operating state of the engine;

an exhaust gas state parameter-estimating step of estimating an exhaust gas state parameter indicative of a state of exhaust gases emitted from the engine, as an estimated exhaust gas state parameter, by inputting the detected combustion state parameter and the detected operating state parameter to a neural network configured as a neural network to which are input the combustion state parameter and the operating state parameter, and in which the exhaust gas state parameter is used as a teacher signal; and an air-fuel ratio control step of controlling the air-fuel ratio based on the estimated exhaust gas state parameter.

20. A method as claimed in claim 19, wherein said combustion state parameter-detecting step includes detecting the combustion state parameter based on an output from an in-cylinder pressure sensor for detecting pressure within a cylinder of the engine.

21. A method as claimed in claim 19, wherein the parameters used in the neural network are set to predetermined values.

22. A method as claimed in claim 19, further comprising a sensor active state-determining step of determining whether an exhaust gas state parameter sensor for detecting the exhaust gas state parameter as a detected exhaust gas state parameter is active, and wherein said air-fuel ratio control step includes performing first feedback control for feedback-controlling the air-fuel ratio such that the estimated exhaust gas state parameter becomes equal to a predetermined target value, when the exhaust gas state parameter sensor is not active, and second feedback control for feedback-controlling the air-fuel ratio such that the detected exhaust gas state parameter becomes equal to the predetermined target value, when the exhaust gas state parameter sensor is active.

23. A method as claimed in claim 22, wherein said air-fuel ratio control step includes performing the first feedback control and the second feedback control, using first and second predetermined feedback gains which are different from each other, respectively.

24. A method as claimed in claim 19, further comprising:

a sensor active state-determining step of determining whether an exhaust gas state parameter sensor for detecting the exhaust gas state parameter as a detected exhaust gas state parameter is active, and a correction step of correcting deviation of the estimated exhaust gas state parameter from the detected exhaust gas state parameter, according to the detected exhaust gas state parameter obtained when the exhaust gas state parameter sensor is active and the estimated exhaust gas state parameter.

25. A method as claimed in claim 24, wherein said correction step comprises:

a correction value-calculating step of calculating a correction value based on the detected exhaust gas state parameter obtained when the exhaust gas state parameter sensor is active and the estimated exhaust gas state parameter;

a correction value-storing step of storing the calculated correction value; and a step of correcting the estimated exhaust gas state parameter obtained when the exhaust gas state parameter sensor is not active, based on the stored correction value.

26. A method as claimed in claim 24, wherein said correction step comprises:

a corrected estimated exhaust gas state parameter-calculating step of calculating a corrected estimated exhaust gas state parameter, based on a model defining a relationship between the corrected estimated exhaust gas state parameter which is obtained by correcting the estimated exhaust gas state parameter and the estimated exhaust gas state parameter; and an identification step of identifying a model parameter of the model, based on the detected exhaust gas state parameter obtained when the exhaust gas state parameter sensor is active and the estimated exhaust gas state parameter, such that the corrected estimated exhaust gas state parameter becomes equal to the detected exhaust gas state parameter, wherein said air-fuel ratio control step includes controlling the air-fuel ratio, using the corrected estimated exhaust gas state parameter as the estimated exhaust gas state parameter.

27. A method as claimed in claim 26, wherein said correction step further comprises a model parameter-storing step of storing the model parameter, and wherein said corrected estimated exhaust gas state parameter-calculating step includes calculating the corrected estimated exhaust gas state parameter based on the model using the stored model parameter, when the exhaust gas state parameter sensor is not active.

* * * * *